Nov. 15, 1960     F. G. LELAND     2,960,359

SNAP RING LOCKING DEVICE

Filed June 27, 1958

INVENTOR.
BY Frank G. Leland

ATTORNEY

United States Patent Office 2,960,359
Patented Nov. 15, 1960

2,960,359

SNAP RING LOCKING DEVICE

Frank G. Leland, Pittsboro, Ind., assignor to General Motors Corporation, Detroit, Mich., a corporation of Delaware Filed June 27, 1958, Ser. No. 745,209

2 Claims. (Cl. 287—53)

This invention relates to a locking device, and more particularly to a means for preventing the open ends of an internal snap ring from contracting and disengaging the snap ring groove.

In installations involving the use of internal snap rings mounted in a housing member, to retain a shaft or machine part within the housing member, there has been much difficulty in retaining the snap ring in its groove. Due to pressures on the snap ring by the machine part, or through excessive vibration and the like, it is possible for the snap ring to become disengaged from the groove in the housing, thus being of no use to retain the machine part or shaft.

The device in which this invention is embodied comprises a washer member disposed between the machine part and the internal snap ring, and having a tab extendable into the opening between the ends of the snap ring. This prevents the ends of the snap ring from contracting and decreasing the diameter of the snap ring, allowing it to disengage from its groove. A more secure and more positive locked retention of the shaft or machine part is provided. The washer member also provides a much needed safety feature in preventing the snap ring from disengaging from the housing in those installations where dangerous results would occur from a shaft or machine part breaking loose. The device is inexpensive to manufacture and is easy to install, thus providing an economical and labor saving retention means.

Figure 1:
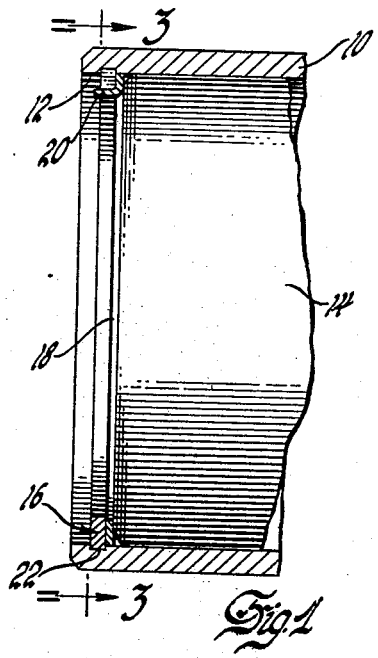
Figure 1 is a fragmentary view of a housing member with a machine part located therein with parts broken away and in section to illustrate the invention.

Referring more particularly to the drawings, Figure 1 illustrates a typical installation in which this invention may be used. A housing member 10, having an internal bore 12, has a shaft or machine part 14 disposed therein. A conventional open ended snap ring 16 is employed to retain the machine part 14 in the housing. Disposed between the snap ring and the machine part is a washer member 18 having a tab 20 that may be disposed between the ends of the snap ring.

Figure 2:
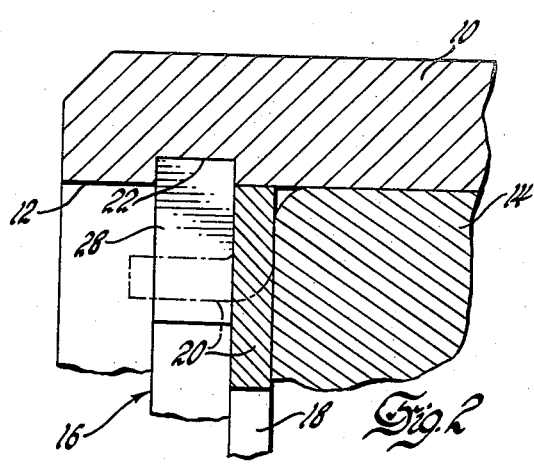
Figure 2 is an enlarged view of a portion of Figure 1 with parts broken away and in section to illustrate the assembly of the parts.
Figure 3:
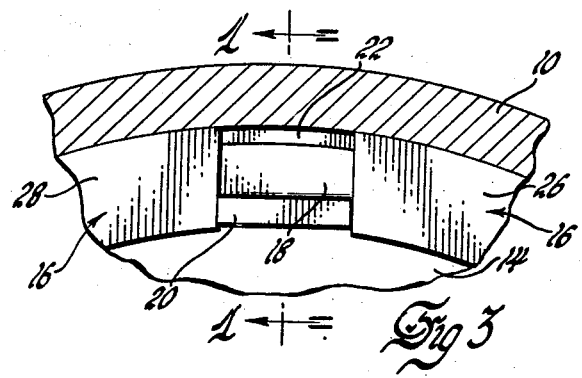
Figure 3 is an end view of the device shown in Figure 1 taken along the line 3—3 of Figure 1 and looking in the direction of the arrows.

In Figure 2, the housing 10 is shown having the machine part 14 inserted therein. The snap ring 16 is seated in an internal annular groove 22 formed in the opening of the housing member 10. In inserting the snap ring in the groove, as in conventional snap ring installations, the snap ring member 16 is contracted to a diameter less than the diameter of the opening 12 so that it may be passed into the opening and allowed to expand into the groove 22.

Figure 4:
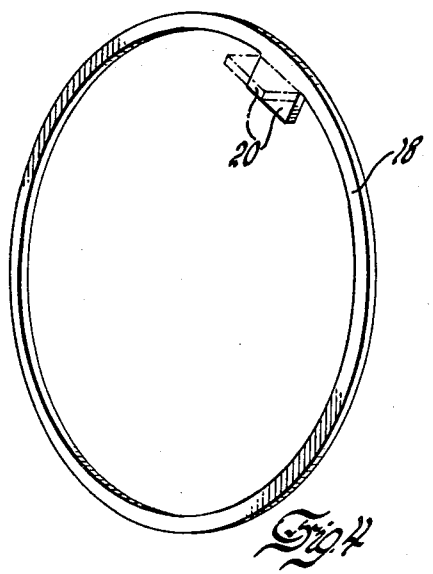
Figure 4 is a perspective view of the washer member having the tab thereon.
Figure 5:
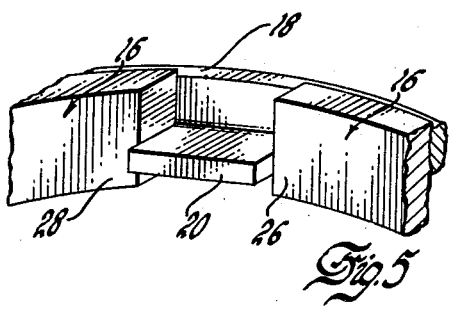
Figure 5 is a perspective view of a portion of the washer member and the snap ring showing the tab in retaining engagement with the ends of the snap ring.

The washer member 18 which may be disposed between the machine 14 and the snap ring 16, is shown in Figure 4. The washer member has an inwardly radially extending tab 20 formed thereon which may be bent to an axial position, as shown in phantom lines in Figure 4. Referring again to Figure 2, the washer member 18 is shown between the machine part 14 and the snap ring 16, with the tab 20 shown in solid lines in a position before being bent into locking relation with the snap ring. The phantom lines in Figure 2 illustrate the locked position of the tab 20.

The snap ring 16 is formed with a gap between the two free ends 26 and 28. As previously stated, the gap provides for contracting of the snap ring for insertion in the groove 22 of the housing. The washer member 18, with the associated tab 20 bent into locking engagement, is disposed behind the snap ring with the tab 20 outwardly extending between the two legs 26 and 28. It may be seen that the tab prevents contraction of the snap ring and the dis-association of the snap ring from its groove.

In assembly of the structure, the machine part 14 is first placed in the housing 10. The washer member 18 is then placed adjacent the machine part, the tab 20 extending radially inwardly of the washer member. The snap ring 16 may then be seated in the groove 22, and the tab bent, in a suitable manner, into locking position between the ends of the snap ring. The snap ring is thus positively locked in its groove, and cannot be shaken or jarred loose.

I claim:

1. In combination, a first member, a second member concentrically disposed in said first member, an internal annular groove formed in said first member adjacent said second member, a resilient arcuate ring of substantially flat rectangular cross section peripherally seated in said groove and having an edge protruding radially therefrom, said ring terminating in spaced ends, a washer member of substantially the same diameter as said second member disposed between said second member and said resilient ring and in generally 360° engagement with said ring, said washer member having an axially extending tab formed therefrom and extending between the spaced ends of said resilient ring to lock said ring in said groove.

2. In combination, a housing having an axial bore therein, an internal annular groove formed in said housing at one end thereof, a machine part receivable in said housing and extending into said bore to a point adjacent said annular groove, a retaining ring having a gap therein receivable in said annular groove to retain said machine part within said housing, and a washer member of substantially the same diameter of said machine part disposed between said retaining ring and said machine part and in generally 360° engagement with said retaining ring, said washer member having an axially extending tab formed therefrom and extending into said gap in said retaining ring to lock said retaining ring in said groove and in said housing.

References Cited in the file of this patent

UNITED STATES PATENTS

| | | |
|---|---|---|
| 2,383,959 | Dick | Sept. 4, 1945 |
| 2,657,078 | Virgil | Oct. 27, 1953 |

FOREIGN PATENTS

| | | |
|---|---|---|
| 497,939 | Germany | May 15, 1930 |
| 349,329 | Great Britain | May 28, 1931 |